US007413796B2

(12) United States Patent
Zhou et al.

(10) Patent No.: US 7,413,796 B2
(45) Date of Patent: Aug. 19, 2008

(54) PRINTING MEDIA FOR COLOR ELECTROPHOTOGRAPHIC APPLICATIONS

(75) Inventors: Xiao-Qi Zhou, San Diego, CA (US); Richard J McManus, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 10/781,151

(22) Filed: Feb. 17, 2004

(65) Prior Publication Data

US 2005/0181185 A1 Aug. 18, 2005

(51) Int. Cl.
*B32B 5/16* (2006.01)

(52) U.S. Cl. ........................ 428/219; 428/323; 428/330

(58) Field of Classification Search ................. 428/219, 428/323, 330
See application file for complete search history.

(56) References Cited

U.S. PATENT DOCUMENTS

| | | | | |
|---|---|---|---|---|
| 5,244,714 | A | 9/1993 | Malhotra et al. | |
| 5,614,325 | A * | 3/1997 | Chartier et al. | 428/537.5 |
| 5,709,976 | A * | 1/1998 | Malhotra | 428/32.11 |
| 6,280,831 | B1 | 8/2001 | Nakanishi et al. | |
| 6,387,478 | B2 | 5/2002 | Fujimoto | |
| 2003/0207089 | A1 | 11/2003 | Nakamura et al. | |
| 2003/0224192 | A1 | 12/2003 | Tani et al. | |

FOREIGN PATENT DOCUMENTS

| | | |
|---|---|---|
| JP | 05-82940 | 11/1993 |
| JP | 06-75417 | 3/1994 |
| JP | 08-123066 | 5/1996 |
| JP | 08-334917 | 12/1996 |
| JP | 11-160906 | 6/1999 |
| JP | 2000-27094 | 1/2000 |
| JP | 2000-514145 | 10/2000 |
| JP | 2001-255687 | 9/2001 |
| JP | 2001-262491 | 9/2001 |
| JP | 2002-180395 | 6/2002 |
| JP | 2003-171893 | 6/2003 |
| JP | 2003-202695 | 7/2003 |
| JP | 2003286687 | * 10/2003 |
| JP | 2003-322993 | 11/2003 |
| JP | 2003-322994 | 11/2003 |
| JP | 2004-27411 | 1/2004 |
| WO | WO02/058929 | 8/2002 |

OTHER PUBLICATIONS

JP2005-039065, office action dated Mar. 20, 2007 with list of references.

* cited by examiner

*Primary Examiner*—Monique R Jackson

(57) ABSTRACT

The present invention is drawn to a media sheet for color electrophotographic printing. The media sheet can comprise a base stock having a first side and a second opposing side, base coating layers coated directly on the first side and the second side, and receiving layers coated directly on the base coating layers. The base coating layers can include inorganic pigments, a binder, and a charge control agent. The receiving layers can include inorganic pigments, a binder, and a discharge control agent. In one embodiment, the binder of the receiving layers can be hollow particle pigments.

31 Claims, No Drawings

PRINTING MEDIA FOR COLOR ELECTROPHOTOGRAPHIC APPLICATIONS

FIELD OF THE INVENTION

The present invention relates generally to printing media. More particularly, the present invention relates to media for use in color electrophotographic printing applications.

BACKGROUND OF THE INVENTION

Color electrophotographic printing is becoming popular for in-house publishing and other applications. To achieve a high quality image, printing media selected for use can play an important role.

Paper blister is common problem that can occur with many coated papers used for electrophotographic printing, typically due to fusing processes required in such printing procedures. Coated papers typically include a hydrophilic paper base that is coated with pigment particulates. When toner images are transferred onto the paper, and the paper/toner combination undergoes fusing, the water absorbed inside the media is typically heated causing vaporization, thereby generating strong vapor pressure beneath the coating. If the vapor pressure cannot dissipate relatively instantly and homogenously along the paper surface, a "popcorn" effect can occur that causes blistering. This can be further exacerbated if the media was prepared or printing occurs under higher humidity conditions. Further, if multiple heated fuser rollers are used, or higher fusing temperatures are present to achieve high toner gloss, blistering can be even more pronounced. Additionally, when duplex printing using media that is coated on both sides, it is even more difficult for water vapor to escape from the media.

Another problem associated with electrophotographic media is related to image defect caused by electrostatic discharge, especially when printing is carried out at a low temperature and/or a low relative humidity condition. This defect can produce uneven color density, particularly in lower toner density areas. The mechanism of this defect caused by an undesirable electrostatic discharge is not fully understood. It can be related to surface smoothness and thickness of the media, where rough surfaces and thicker media usually exhibit more significant defects than smoother and/or thinner media, but it is also related to the resistivity of the media. The electrical resistivity of the media, with an optimum value of $1\times10^{9}$ to $1\times10^{11}$ ohm/square, plays a dominant role in controlling image quality. When the surface resistivity is below $1\times10^{8}$ ohm/square, an insufficient amount of toner can be transferred to the receiving layer, leading to low optical density print images. When the surface resistivity exceeds $1\times10^{13}$ ohm/square, an excessive amount of electrostatic charge can be generated during toner transfer and paper transport, which can lead to uneven toner density caused by electrical discharge. Additionally, the speed of charge dissipation on the media surface, known as electrical relaxation, is also related to image defect caused by electrostatic charge. Thus, an appropriate relaxation time can be desired, keeping in mind that too long of a dissipation time can result excessive electrostatic building-up.

SUMMARY OF THE INVENTION

It has been recognized that it would be advantageous to develop a media sheet that is effective for use with color electrophotographic printing processes, exhibiting reduced blistering and discharge defects under a variety of conditions. Such a media sheet can comprise base stock having a first side and a second opposing side; base coating layers coated directly on the first side and the second side; and receiving layers coated directly on the base coating layers. The base coating layers can include inorganic pigments, a binder, and a discharge control agent. The receiving layers can include inorganic pigments, hollow particle pigments, and a discharge control agent.

In an alternative embodiment, a media sheet for color electrophotographic printing can comprise a base stock having a first side and a second opposing side, base coating layers coated directly on the first side and the second side, and receiving coating layers coated directly on the base coating layers. The base coating layers can include inorganic pigments, a binder, and a charge control agent. The receiving layers can include inorganic pigments, a binder, and a sodium salt of a sulfonated polystyrene discharge control agent.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular form of "a," "an," and "the" include plural referents unless the context clearly dictates otherwise. Thus, for example, reference to "a binder" includes reference to one or more of such materials.

The term "base stock" includes traditional papers such as woody paper, synthetic paper, and regenerated paper, as well as photobase and polymeric films.

The term "base coating layer composition" or "base coating layer(s)" refers to coating compositions and coating layers that include inorganic pigments, binder, and a discharge control agent. When referring to the composition or the coated layer generally, it is understood that a discussion of one can apply to the other. For example, a statement that a base coating layer composition includes inorganic pigments should also be understood to mean that a base coating layer also includes inorganic pigments.

"Image receiving layer composition," "receiving layer composition," "image receiving layer(s)," or "receiving layer (s)" refers to coating compositions and coatings that include inorganic pigments, hollow particle pigments, and discharge control agent. When referring to the composition or the coated layer generally, it is understood that a discussion of one can apply to the other. For example, a statement that a receiving layer composition includes hollow particle pigments should also be understood to mean that a receiving layer itself includes hollow particle pigments.

"Inorganic pigments" include particulates that can be in a powder or slurry form, and include such materials as titanium dioxide, hydrated alumina, calcium carbonate, barium sulfate, silica, clay, and zinc oxide. Other inorganic pigments can be used as would be known to one skilled in the art after considering the present disclosure.

"Binder" refers to compositions that can be used to enhance the adhesion within a base coating layer, and optionally, can provide adhesion within the receiving layer. Binder can also provide adhesion between media layers. Typically, the binder can be a water soluble polymer or water dispersible polymeric latex.

"Discharge control agent" refers to compositions that can be used to reduce electrostatic discharge-caused image defects that can occur in electrophotographic printing processes. In one embodiment, these agents are moisture and temperature insensitive polymeric materials that can include moieties of ionic groups of small molecules that are sensitive to temperature and humidity. Ionic conductive polymers and polymeric electrolytes containing alkali metal salts are generally good compositions for this function. They include, for example, cationic, anionic, amphoteric, and nonionic polymeric surfactant or polymer electrolytes. A good example of a discharge control agent that is highly functional is sodium salt of sulfonated polystyrene. A wide variety of weight average molecular weights can be used, being limited only by functionality. When selecting a discharge control agent for use, amounts of the discharge control agent itself, choice of base stock, and/or choice of amounts and types of other coating ingredients can be considered to avoid blistering.

"Sodium sulfonated polystyrenes" that can be used in accordance with embodiments of the present invention include polymers wherein substantially every repeating unit is sulfonated, and in one embodiment, can have a weight average molecular weight from 70,000 Mw to 1,000,000 Mw. When using higher molecular weight sulfonated polystyrenes, amounts of the polystyrene itself, choice of base stock, and/or choice of amounts and types of other coating ingredients can be considered to avoid blistering. Other sulfonated polystyrenes can also be used that deviate from this embodiment.

"Plastic hollow pigments" or "hollow particles" refer to particulates that include one or more void(s) within the outer dimension of the particle volume. For example, in one embodiment, hollow particles can have a void volume from 30% to 70%. In another embodiment, hollow particles can have a particulate size from 0.3 μm to 2 μm and a glass transition temperature (Tg) from 50° C. to 120° C. Typically, water is present within the voids, but becomes substantially removed from the voids when the coating containing the hollow particle pigments is dried.

The term "substantially" when used with another term shall include from mostly to completely.

The term "particle size" represents the mean particle size for which 50% of the particles in the pigments are less than this value.

"Index of particle size distribution" or "particle size distribution" represents a size ratio according to Formula 1 below:

$$I=D_{90}/D_{10} \qquad \text{Formula 1}$$

where $D_{90}$ is the average particle size for which 90% of particles of the pigment are smaller than this value, and $D_{10}$ is the average particle size for which 10% of particles of the pigment are also smaller than this value.

Temperature, ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The term "about" when referring to a numerical value or range is intended to encompass the values resulting from experimental error that can occur when taking measurements.

With these definitions in mind, a media sheet for color electrophotographic printing can comprise base stock having a first side and a second opposing side, base coating layers coated directly on the first side and the second side, and receiving layers coated directly on the base coating layers. The base coating layers can include including inorganic pigments, a binder, and a discharge control agent. The receiving layers can include inorganic pigments, hollow particle pigments, and a discharge control agent.

Alternatively, a media sheet for color electrophotographic printing can comprise a base stock having a first side and a second opposing side, base coating layers coated directly on the first side and the second side, and receiving coating layers coated directly on the base coating layers. The base coating layers can include inorganic pigments, a binder, and a charge control agent. The receiving layers can include inorganic pigments, a binder, and a sodium salt of a sulfonated polystyrene discharge control agent.

Base Stock

With respect to the base stock, there are many different types of materials that can be used in accordance with embodiments of the present invention. Such base stock materials include, but are not limited to, woody paper, synthetic paper, or regenerated/recycled papers. Base stock generally known in the art as photobase can also be used. Additionally, some polymeric films rather than traditional fabric paper can also be used as base stock, such as, polyethylene, polypropylene, polyester, polycarbonate, cellulose ester, polyimide, polyvinylchloride, polyvinyl acetate, as well as other similar materials that would be resistant to heat and mechanical tearing that can occur during fusing as the media passes through a printer or copier.

Fabric paper made of fibers, such as Northern or Southern softwood and hardwood, and pulps can be of particular useful as base stock. These paper pulps can include chemical pulp, such as hardwood bleached Kraft pulp, softwood bleached Kraft pulp, softwood bleached sulfite pulp, stone groundwood, and/or refiner pulp. Non-wood pulp such as cotton pulp, recycled wastepaper pulp, or the like, can also be used for making the base stock.

Due to the application of double coating layers in accordance with embodiments of the present invention, the requirement for the whiteness or brightness of the base stock is not critical, though very white and bright base stock can be used. Additionally, filling and sizing processing of papers that is known in the art can be used to control paper density, stiffness, and/or surface properties. In one embodiment, if present, the ash content of the base stock, i.e., the percentage of inorganic material incorporated inside the base paper including inorganic fillers and pigment material derived from a recycled fiber component of the substrate, can be from 8 wt % to 20 wt % with a paper stiffness from about 300 to 800 Gurley units.

In another aspect of the present invention, the internal bonding strength of the base can be from 170 to 500 J/m$^2$. By providing internal bonding strength that is at least this amount, if the coating porosity of the base coating layer and the receiving layer is well controlled, as will be described hereinafter, paper blistering can be greatly reduced. In another embodiment, the base stock can be a paper, and the internal fabric network of the base stock can have an internal bonding strength from 205 to 320 $J/m^2$ to help resist delamination by moisture vapor at high temperature. In still another embodiment, excellent performance can be achieved when paper base stock is used, and the base stock utilizes longer fibers and bonding enhancement agents, as are known in the art. Alternatively or additionally, the paper stock can comprise pulp which has been forcedly beaten to increase its inter-fiber bonding, which process is also known in the art.

The base weight of the paper stock can also be considered to avoid blistering of subsequently applied layers. With respect to base stocks with the same internal bonding strength, lighter weight papers typically result in a higher local temperature during toner fusing processes. Conversely, thicker base stock can act as a "thermal sink" to absorb the heat flow locally. As such, in one embodiment, the base stock can have a weight from 60 $g/m^2$ to 250 $g/m^2$.

Base Layer Coating Composition and Receiving Layer Coating Composition

Referring now to the coatings that can be applied to the base stock in accordance with embodiments of the present invention, two different types of coatings are sequentially applied, namely, a base coating layer composition to form base coating layers, and a receiving layer composition to form receiving layers. The base coating layer composition (and layers formed therefrom) can include inorganic pigments, a binder, and a discharge control agent. The receiving layer composition (and layers formed therefrom) can include inorganic pigments, hollow particle pigments, a discharge control agent, and optionally, a binder. As apparent from this brief description, both the base coating layer composition and the receiving coating composition include inorganic pigments and a discharge control agent. Additionally, the base coating layer composition includes a binder, and the receiving layer composition can optionally include a binder. Thus, the only component completely unique to one composition or layer over the other is the presence of hollow particle pigments in the receiving layer composition used to lay down the receiving layers. This is not to say that a base coating layer cannot have different inorganic pigments than the receiving layer, but just that the classes of materials in both layers have commonality. Thus, a general discussion of the inorganic pigments, binder, and discharge control agent will follow that applies to both the base coating layer and composition, and the receiving layer and composition, followed by a discussion of the hollow particles and other considerations.

Regarding the amounts of each component that can be present in each layer, 100 parts by weight of inorganic pigments can be used as a constant figure. Thus, a base coating layer composition can include 100 parts by weight inorganic pigments, from 1 to 15 parts by weight binder, and from 5 to 20 parts by weight charge control agent. Likewise, a receiving layer composition can include 100 parts by weight inorganic pigments, from 5 to 10 parts by weight hollow particles, and from 1 to 5 parts by weight charge control agent. These ranges are provided as guidelines, and can be altered to achieve a desired affect. Additionally, various coating weights and thickness can be applied for each coating layer. For example, each base coating layer can be applied at a coating weight from 5 to 30 $g/m^2$, and in another embodiment, from 10 to 15 $g/m^2$. Additionally, each receiving layer can be applied at a coating weight from 5 to 30 $g/m^2$, and in another embodiment, from 10 to 15 $g/m^2$. Further, in a more detailed embodiment, each base coating layer and receiving layer can be applied at from about 10 μm to 15 μm in thickness.

Inorganic Pigments

Inorganic pigments can be present in both the base coating layer composition and the receiving layer composition. Though it is not required that the same inorganic pigments be present in each layer, typically, the inorganic pigments of the receiving layer composition or layer(s) are of a smaller particle size than the inorganic pigments of the base coating layer composition or layer(s). For example, in one embodiment, the inorganic pigments of the base coating layers can have a mean size from 0.2 μm to 1.5 μm in size, and the inorganic pigments of the receiving layers can be from 0.1 μm to 0.5 μm in size. These inorganic pigments can be in a powder or slurry form, and examples include, but are not limited to, titanium dioxide, hydrated alumina, calcium carbonate, barium sulfate, silica, clays (such as high brightness kaolin clays), and zinc oxide.

In one embodiment, an inorganic pigment that has desirable properties for use is calcium carbonate. Such desirable properties include high brightness, gloss, opacity, good rheology, and good coating ability. Additionally, calcium carbonate is relatively economical to obtain. In both the base coating layer and the receiving layer, the inorganic pigments can be loaded to a maximum level without increasing cost, as the cost of a coating solution containing these particulates can be cheaper than the paper pulp. This combination provides a high performance, low cost coated paper compared to plain paper having a similar weight.

Many different types of calcium carbonate can be used in the base coatings of the present invention. In one embodiment, a function of the base coating can be to create a smooth, pre-coated layer for the application of the receiving layer, as well as to enhance opacity of the media as a whole. Additionally, the base coating can be such that it has a porous structure to prevent blistering. In accordance with these goals, an example of one composition that can be used is a ground calcium carbonate (GCC) that has a roughly spherical morphology with a relatively uniform particle size, i.e., index of particle size distribution can be from 1.5 to 6, and in a more specific embodiment, from 2 to 4. The average or mean particle size can be about 0.2 to 1.5 μm, and the specific surface area can be about 7 to 20 $m^2/g$. Ground calcium carbonate of this type also shows very good rheological behavior, i.e., lower viscosity at high loading percentage. One advantage of the use of calcium carbonate is that the material requires a smaller amount of binder to achieve good pick-strength (which is useful to further reduce blistering) compared to the flake-like morphology of kaolin clay pigments. Ground calcium carbonate with a relatively narrow particle size distribution, coupled with a minimum use of a film-forming binder, can provide a very porous coating structure that includes a large number of voids (free volume). The voids can be generated as spherical particles of similar size are placed together, which provides a passageway for moisture vapor to escape, thus, alleviating blistering. Conversely, if many multiple sizes of particles are present, i.e., larger particle size distribution, smaller particles can tend to fill gaps between larger particles, thereby reducing the ability of a coating to release gas vapor generated at the base stock. In other words, larger particle size distribution can lead to more efficient packing, which can be undesirable as it relates to inhibiting blistering. Conversely, though functional, extremely narrow particle size distributions may also not be desirable in some embodiments, as coating processing problems, such as blade scratching resulting from poor water retention and coating weight controlling, can occur. Thus, in one embodiment, the average or mean particle size of inorganic pigments in the base coating can be from 0.2 μm to 1.5 μm, with a particle size distribution index from 1.5 to 6, and in a more detailed embodiment, from 2 to 4.

With specific respect to the receiving layer, alternative properties can be desired for use. For example, with this coating layer, besides having a porous structure, the pigments can be configured to contribute to a high level smoothness, gloss, whiteness, brightness, and/or image quality as printed under various conditions. In one embodiment, a spherical ground calcium carbonate (GCC) with very small particle size (<0.3 μm) and a relatively narrow particle size distribution provides the desired results. In one embodiment, in the receiving layer coating, the inorganic pigments can have an average or mean particle size from 0.2 μm to 0.3 μm in size, and a particle size distribution from 2.5 to 3.5. In this embodiment, the ground calcium carbonate can be included in a receiving layer composition at a high solid content level, such as from about 68 wt % to 70 wt %. The particle size and color of the ground calcium carbonate solids can contribute to gloss development.

In another embodiment, a precipitated calcium carbonate (PCC) with a mean particle size 0.2 μm to 0.3 μm and a particle size distribution index of 2 to 2.5 can be used in the receiving layer composition. This pigment has needle-like morphology and a high aspect ratio (length-to-width ratio), which can create an even more open structure as a result of loose packing of irregular particles. In one specific embodiment, to control the gloss level range from high gloss (>80%) to "soft" gloss (20 to 50%), when measured at 75 degrees with a BYK-Gardner glossmeter, to meet different customer printing requirements, a blend of ground calcium carbonate can be used in the base layer coating, and ground calcium carbonate and/or precipitated calcium carbonate can be used in the receiving layer coating. Depending on the ratio of material used, the gloss level can be readily controlled, as would be known to one skilled in the art after considering the present disclosure.

Binder

Referring now to the binder that can be present in the base coating layer composition, and optionally, in the receiving layer composition, binder can be included that supplies binding adhesion between inorganic pigments. With respect to the base coating layer composition, the adhesion force between base paper stock and the inorganic pigments in the base coating layer can be provided by the use of a binder. With respect to the receiving layer composition, the adhesion force between base coating layer and the inorganic pigments and plastic hollow particles in the receiving layer can be enhanced by the optional use of a binder. Binders that can be used include water soluble polymers such as polyvinyl alcohol, starch derivatives, gelatin, cellulose derivatives, acrylamide polymers, or water dispersible polymers such as acrylic polymers or copolymers, vinyl acetate latex, polyesters, vinylidene chloride latex, and styrene-butadiene or acrylonitrile-butadiene copolymer latex. The amount of binder used in the formulation is related with type and amount of pigments, and can be measured by "wet-pick" and "dry-pick" strength. The wet-pick and dry-pick strengths refer to adhesion strength of a coating layer against localized delaminating from the underlying substrate in the "wet status" such as during the manufacture process (wet-pick), and "dry status" such as during printing and post-printing usage and storage (dry-pick). In a specific embodiment, the base coating layer can include a styrene-butadiene copolymer. The binding power of this type of binder can depend upon its glass transition temperature (Tg), which can be controlled by the ratio of styrene to butadiene on a macromolecular chain. Typically, the greater the number of butadiene units, the lower the glass transition temperature and the stronger the tacky behavior. However, with a decrease in glass transition temperature, the binder can show stronger "film-forming" characteristic which is not normally beneficial to prevent media blistering. In one embodiment, copolymer latexes of styrene and butadiene with a glass transition temperature from about 0° C. to 10° C. for the base coating, with a minimum amount of binder (4 to 6 parts binder to 100 parts inorganic pigments) only partly filling voids between pigment particles, provided good results. This compromise of material properties forms a porous coating structure that maintains good wet pick and dry pick strength. More generally, with respect to all binders in general that can be used, from 1 to 15 parts by weight binder to 100 parts by weight inorganic particulates can be present in the base coating layer composition.

Though the above more traditional binders have been described primarily with respect to the base coating, optionally, a small amount of traditional binder such as styrene-butadiene copolymer latex with a glass transition temperature from 15° C. to 25° C. can be present in the receiving layer. For example, if present, from 0.1 to 8 parts binder to 100 parts inorganic pigments can be present. Though the use of more traditional binders is not required in the receiving layer, other material can be present that provides binding capabilities, as well as other properties. As the receiving layer can typically be prepared to provide high to medium gloss to a printed image, an appropriate hardness level without tacky properties (to avoid any scratches and paper jams during printing) can be achieved by using plastic hollow pigments, otherwise known as hollow particles, as will be discussed hereinafter.

Discharge Control Agent

Referring now to the discharge control agent that can be present in the base coating layer composition and the receiving layer composition, various agents can be used with varying results. The problems associated with the generation and dissipation of electrostatic charge can result in image defects in the electrophotographic printing process. These so-called "discharge" defects can be seen as random anomalies in the printed pattern, either in a staggered or straight line pattern, or can appear as uneven color density in lower toner density areas. The mechanism of the discharge defects is somewhat complex, but has been correlated to surface morphology, as well as surface and volume resistively of the media. When the resistivity of the media increases, the media can tend to retain additional charge. As poorly electrically conducting paper passes over the rollers found in printers and copiers, friction will cause additional static charges to be built up on the paper. Thus, accumulation of electric charge not only produces image defects, but can also cause paper feed problems during printing. This is in part because the charges on the paper cause the sheets to stick together, and thus, they cannot be properly manipulated by certain paper handling mechanisms. Electrostatic charge that is necessarily built up to attract toner has been dissipated in the prior art by incorporating one or more electrical conductive "antistatic" layers inside media. This method, though effective, is not ideal for low-cost paper based electrophotographic printing media.

In accordance with embodiments of the present invention, a discharge control agent that can be moisture and temperature insensitive (or substantially insensitive) can be included in various layers of the media. The discharge control agent can also include moieties of ionic groups of small molecules that are generally more sensitive to temperature and humidity. Ionic conductive polymers and polymeric electrolytes containing alkali metal salts are generally good candidates for this function. They include, for example, cationic, anionic, amphoteric, and nonionic polymeric surfactant or polymer electrolytes. Conductivity, moisture sensitivity, and temperature sensitivity can depend upon the chemical composition of the polymers, as well as the ionic content on the macromolecular chain. The molecular weight of these polymeric materials can also be varied, depending on the composition. Generally, at the same ionic level, a higher molecular weight polymer provides more insensitive ionic conductivity to temperature and humidity. However, higher molecular weight substances also usually show stronger film-forming behavior, which can have a negative impact on blistering performance. Thus, a balance between good ionic insensitivity and low film-forming behavior can be desirable. Additionally, non-ohmic dielectric relaxations of ionic polymeric materials can also contribute to desired performance. Dielectric relaxation of media involves not only the intrinsic conductivity of the base stock, which is the product of intrinsic charge density and mobility, but also its charge lifetime and the injection of charge at the interface.

Polyelectrolytes provide an example of a group that has a tendency to dissipate electrostatic charges quickly. Examples of such polyelectrolytes include, but not limited, poly(acrylic acid), poly(sodium acrylate), poly(dimethylaminoethyl methacrylate), poly-N-vinylimidozole, poly(styrene-sulfononic acid). Though functional, most of these polyelectrolytes still show some degree of humidity dependence, even though it is not as great as small molecule electrolytes. Structures that have a polar or functional group present on a polymer have a positive influence on the dielectric relaxation, particularly when the polar groups are present as a side chain constituent, rather than in the main chain of the polymer. Examples of polyelectrolytes having polar side group constituents include sulfonated polystyrenes, such as poly(sodium stryrenesulfonates) having a molecular weight ranging from 70,000 Mw to 1,000,000 Mw. This polymer class is generally water soluble, and thus, is quite compatible with the water dispersed paper coating system of the present invention. With respect to these polymers, the half-lives of charge decay are 0.8 seconds in 5% relative humidity and only reduced to 0.6 second at 60% relative humidity. Conversely, other polyelectrolytes, such as poly-N-vinyllimidazole, show half-lives of 800 seconds in 5% relative humidity, but dropping down to 0.4 second at 60% relative humidity.

Hollow Particles

Plastic hollow pigments, or hollow particles, are typically water dispersed polymeric hollow spherical particles filled with water inside polymeric shells. When drying occurs during coating, the water diffuses through the shell, leaving an air filled core. In one embodiment, plastic pigments can be made of styrene emulsion polymers with a glass transition temperature (Tg) of 100° C., i.e., the hollow particle is non-film forming in ambient conditions and remains as discrete particles during coating. These or other hollow particles can be used in a unique way in accordance with embodiments of the present invention. For example, a relatively large amount, 8 to 15 parts by weight per 100 parts by weight inorganic pigments, can be used to replace some of the inorganic pigments. Hollow particulates can have a void volume from 20% to 70%. In one embodiment, the hollow particulates can have a particulate size from 0.3 μm to 2 μm and/or a glass transition temperature from 50° C. to 120° C. Examples of hollow particles that can be used in accordance with embodiments of the present invention include Ropaque BC-643 (Rohm-Haas), Ropaque HP-543 (Rohm-Haas), Ropaque OP-84 (Rohm-Haas), and HS-3000NA (Dow Chemical).

During the calendaring processing, which will be discussed hereinafter, the hollow particles can become partially deformed, thereby forming hollow particle reinforced inorganic particles in both the interface areas of the base coating layer and the receiving layer. Without the use of a traditional binder (or with the use of a very small amount of binder) in the receiving layer, good integrity and reduced peel-off or delamination can be achieved.

It is important to note that the hollow particles, in some embodiments, can function to bind the inorganic pigments and the discharge control agent together. In these embodiments, the presence of the hollow particles can remove the need to add more traditional binder to the receiving layer. However, in some embodiments, it may be desirable to use a traditional binder in conjunction with, or rather than the hollow particles in the receiving layer. Thus, in one embodiment, the presence of the hollow particles in the receiving layer can be optional. For example, a traditional binder can be used rather than the hollow particles when it is desired to reduce the gloss of a printed image.

Optional Additives

Aside from the major components described above, small amount of coating additives can also be present in either of the coating compositions. Such additives include dyes to control paper color, optical brightness agents, lubricants, surfactants, rheological modifiers, cross-linkers (such as for water proofing), deformers, and/or dispersing agents, to name a few examples.

Application of Coatings

Base coating layer(s) and receiving layer(s) can each be applied to a single side of a base stock, though preferably, both layers are applied to both sides of the base stock. Both sides can be applied using an on-machine or off-machine coater. Examples of suitable coating techniques including slotted die application, roller application, fountain curtain application, blade application, rod application, air knife application, gravure application, air brush application, and others known in the arts.

The base coating layers and the receiving layers can be applied in one or more layers simultaneously, with a coating weight of 5 to 30 g/m$^2$, and in one embodiment, from 10 to 15 g/m$^2$ for each coating layer on each side. In one embodiment, the solids content of each the coating composition can range from 60 wt % to 75 wt %, with a viscosity of 1000 cps to 1500 cps as measured by low shear Brookfield viscometer at a speed of 100 rpm, or 30 cps to 40 cps at a higher shear rate of 4500 rpm using a high shear Hercules viscometer. The coating layer can then be dried by convection, conduction, infrared radiation, atmospheric exposure, or other known method.

Calendaring

After coating the base stock with the base coating layer composition and the receiving layer composition (or after each layer is individually applied), a calendaring process can be used to achieve desired gloss or surface smoothness. The calendaring device can be a separate super calendaring machine, an on-line soft nip calendaring unit, an off-line soft nip calendaring machine, or the like.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Preparation of Media Sheets Using Various Base Stock

A. Preparation of Base Coating Layer Composition

A base coating layer composition was prepared in accordance with the formula of Table 1 below:

TABLE 1

| Ingredient | Parts by weight |
|---|---|
| Ground Calcium Carbonate Slurry (about 0.3 μm spherical particulates) | 100 |
| [1]DL 930 | 4.5 |
| [2]Poly(sodium stryrenesulfonate) | 10 |
| Rheology modifier | 0.55 |
| Colorant | 0.009 |

[1]Supplied by Dow Chemicals
[2]Discharge control agents of 75,000 MW poly(sodium stryrenesulfonate), 200,000 MW poly(sodium stryrenesulfonate), and 1,000,000 MW poly(sodium stryrenesulfonate) were used to form three different base coating layer compositions to be coated separately on three base stock samples.

The compositions of Table 1 (base coating layer compositions) were prepared by admixing the ground calcium carbonate and the Dow DL930 in a mixing tank for 30 minutes. After 30 minutes, the rheology modifier and the colorant were added to the tank and mixed for an additional 10 minutes. The poly(sodium stryrenesulfonate) was then added into the tank under agitation, and the composition was mixed for an additional 30 minutes.

B. Preparation of Receiving Layer Composition

A receiving layer composition was prepared in accordance with the formula of Table 2 below:

TABLE 2

| Ingredient | Parts by weight |
|---|---|
| Ground Calcium Carbonate Slurry (about 0.25 μm spherical particulates) | 100 |
| Ropaque HP-543P (hollow particles) | 10 |
| [3]Poly(sodium stryrenesulfonate) | 3.3 |
| Rheology modifier | 0.55 |
| Colorant | 0.009 |
| Optical brightener | 0.5 |

[3]Discharge control agents of 75,000 MW poly(sodium stryrenesulfonate), 200,000 MW poly(sodium stryrenesulfonate), and 1,000,000 MW poly(sodium stryrenesulfonate) were used to form three different receiving coating layer compositions to be coated separately on three base stock samples.

The compositions of Table 2 (receiving layer compositions) were prepared by admixing the ground calcium carbonate and the Ropaque HP543P in a mixing tank for 30 minutes. After 30 minutes, the rheology modifier, colorant, and optical brightener were then added to the tank and mixed for an additional 10 minutes. The poly(sodium stryrenesulfonate) was added into the tank under agitation, and the composition was mixed for an additional 30 minutes.

C. Coating Base Stock with Base Coating Layer Composition and Receiving Layer Composition A base coating layer composition of Example 1 (200,000 MW discharge control agent) was coated on both side of several base paper stock samples using a blade coating method. The base paper stock samples that were coated included those described in Table 3 below:

TABLE 3

| Base paper stock type | Base stock paper weight, g/m² | Internal bonding strength, J/m² |
|---|---|---|
| BP-100 | 100 | 152 |
| BP-107 | 107 | 130 |
| [4]BP-60 | 60 | 290 |
| BP-70 | 70 | 320 |
| BP-100-2 | 100 | 260 |
| BP-140 | 140 | 205 |

[4]A first base stock sheet was coated with 75,000 MW discharge control agent (in both coating layers); a second base stock sheet was coated with 200,000 MW discharge control agent (in both coating layers); and a third base stock sheet was coated with 1,000,000 MW discharge control agent (in both coating layers).

Example 2

Blister Testing

Each of the coated media sheets prepared in Example 1 was subjected to a blister test. Specifically, two different color electrophotographic printers made by Hewlett-Packard (color Laserjet 4550 and color Laserjet 9500), each equipped with double heated rolls, was set to a “gloss model” setting, i.e., higher pressure and slower speed as the media passes the fusing rollers of the printer. The tests were carried out in an environmental chamber of 30° C. and 80% relative humidity. The printers were acclimated in the chamber for at least 72 hrs, and the coated media to be tested was also acclimated for 24 hrs. As set forth in Example 1 above, with one base stock exception, all of the base stock was coated identically with compositions as set forth in Example 1 and Example 2, each using a 200,000 Mw discharge control agent. The one exception was that three sheets of base stock SI-60 was coated with the compositions of Example 1 using a 75,000 Mw, 200,000 Mw, and 1,000,000 Mw discharge control agent. The blistering results are shown in Table 4 below:

TABLE 4

| Base stock | CLJ 4550 | CLJ 9500 |
|---|---|---|
| BP-70 | No blister | No blister |
| BP-107 | Paper blister | Paper and toner blister |
| BP-100 | Paper blister | Paper blister |
| BP-60 (75,000 Mw discharge control agent) | No blister | No blister |
| BP-60 (200,000 Mw discharge control agent) | No blister | No blister |
| BP-60 (1,000,000 Mw discharge control agent) | Paper blister | Paper blister |
| BP-100-2 | No blister | No blister |
| BPI-138 | No blister | No blister |

As can be seen by Table 4 above, blistering was absent when base stock had a greater internal bonding strength. Additionally, blistering was absent when using a lower molecular weight charge control agent. This is not to say that lower internal bonding strength base stocks or higher molecular weight discharge control agents cannot be used, but that a trend toward higher internal bonding strength base stocks and lower molecular weight discharge control agents exists. For example, a higher molecular weight discharge control agent can work well with many base stocks having higher internal bonding strengths.

Example 3

Preparation of Media Sheets Using Various Inorganic Pigments

The base coating composition (200,000 MW discharge control agent) and the receiving layer composition (200,000 MW discharge control agent) of Example 1 were modified to study the influence of inorganic pigments on controlling blister. In this example, ground calcium carbonate (GCC) used in Example 1 for the receiving layer composition was replaced with another ground calcium carbonate having a larger mean particle size and distribution (GCC'), a similar mean particles size and distribution (GCC"), and a chemical precipitated calcium carbonate (PCC), as described more fully in Table 5 below:

TABLE 5

| | Mean particle size (μm) | Index of particle size distribution | Specific surface area ($m^2/g$) |
|---|---|---|---|
| GCC' | 0.30 | 6.5 | 3.5 |
| GCC" | 0.22 | 2.8 | 20 |
| PCC | 0.30 | 2.3 | 7.0 |

The coating procedure was similar to that described in Example 1C, and the base stock that was coated was BP-70.

Example 4

Blister Testing

Each of the coated media samples prepared in Example 3 was subjected to a blister test. Specifically, two different color electrophotographic printers made by Hewlett-Packard Company (color Laserjet 4550 and color Laserjet 9500), each equipped with double heated rollers, was set to a "gloss model" setting, i.e., higher pressure and slower speed as the media passes the fusing rollers of the printer. The tests were carried out in an environmental chamber of 30° C. and 80% relative humidity. The printers were acclimated in the chamber for at least 72 hrs, and the coated media to be tested was also acclimated for 24 hrs. The blistering results are shown in Table 6 below:

TABLE 6

| Inorganic pigments | CLJ 4550 | CLJ 9500 |
|---|---|---|
| GCC' | Paper blister | No blister |
| GCC" | No blister | No blister |
| PCC | No blister | No blister |

As can be seen by Table 6 above, a wider particle size distribution (GCC') exhibited poorer anti-blistering performance, which can be attributed to increased particle packing.

Example 5

Preparation of Media Sheets Using Various Discharge Control Agents

The base coating composition and the receiving layer composition of Example 1 were modified to study the influence that different charge control agents have with respect to discharge defects. Using the SI-70 base stock, various formulations set forth in Example 1 were prepared, the only difference being related to the charge control agent. Specifically, the charge control agents used are set forth in Table 7, as follows:

TABLE 7

| Charge control agent | Molecular Weight | Parts by weight |
|---|---|---|
| NaCl | 58 | 1.5 |
| [5]Cyaguard SP | N/A | 2.5 |
| Poly(sodium stryrenesulfonate) | 75,000 | 3.3 |
| Poly(sodium stryrenesulfonate) | 200,000 | 3.3 |
| Poly(sodium stryrenesulfonate) | 1,000,000 | 3.3 |

[5]Supplied by Ciba Chemicals

Example 6

Charge Defect Testing

Four different types of commercially available color electrophotographic printers manufactured by Hewlett-Packard Company (color Laserjet 4550, color Laserjet 5500, color Laserjet 4600, and color Laserjet 9500) were used to study discharge defects in accordance with embodiments of the present invention. The tests were carried out in an environmental chamber of 10° C. and 15% relative humidity. The printers were acclimated in the chamber for at least 72 hrs before the test, while the coated sheets to be tested were acclimated at least 24 hrs before the test. The results are summarized in Table 8 below, wherein 0 represents the absence of charge defects and 5 indicates poor charge defect performance.

TABLE 8

| Charge control agent | CLJ4550 | CLJ5500 | CLJ4600 | CLJ9500 |
|---|---|---|---|---|
| NaCl | 5 | 5 | 5 | 3 |
| Cyaguard SP | 5 | 5 | 4 | 3 |
| Poly(sodium stryrenesulfonate) 75,000 MW | 1 | 1 | 0 | 0 |
| Poly(sodium stryrenesulfonate) 200,000 MW | 0 | 1 | 0 | 0 |
| Poly(sodium stryrenesulfonate) 1,000,000 MW | 0 | 0 | 0 | 0 |

The above results indicate that the sulfonated polyelectrolytes provide a stronger control over preventing charge defects. With the molecular weight increasing, the control effects become better. The discharge control agents of smaller size tended to provide poorer results.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A media sheet for color electrophotographic printing, comprising:

a) base stock having a first side and a second opposing side;

b) base coating layers coated directly on the first side and the second side, the base coating layers including inorganic pigments, a binder, and a discharge control agent; and c) receiving layers, different than the base coating layers, coated directly on the base coating layers, the receiving layers including inorganic pigments, hollow particle pigments, and a discharge control agent.

2. A media sheet as in claim 1, wherein the base stock is selected from the group consisting of woody paper, synthetic paper, and recycled paper.

3. A media sheet as in claim 1, wherein the base stock is a polymeric film.

4. A media sheet as in claim 1, wherein the base stock has an internal bonding strength from 170 to 500 $J/m^2$.

5. A media sheet as in claim 1, wherein at least one of the base coating layers includes, by weight, 100 parts inorganic pigments, from 1 to 15 parts binder, and from 1 to 20 parts discharge control agent.

6. A media sheet as in claim 1, wherein at least one of the receiving layers includes, by weight, 100 parts inorganic pigments, from 5 to 20 parts hollow polymer pigments, and from 1 to 20 parts discharge control agent.

7. A media sheet as in claim 1, wherein the inorganic pigments of the base coating layers and the receiving layers are particulates independently selected from the group consisting of titanium dioxide, hydrated alumina, calcium carbonate, barium sulfate, silica, clay, and zinc oxide.

8. A media sheet as in claim 7, wherein the inorganic pigments of the base coating layers are calcium carbonate particulates.

9. A media sheet as in claim 7, wherein the inorganic pigments of the receiving layers are calcium carbonate particulates.

10. A media sheet as in claim 1, wherein the inorganic pigments of the receiving coating layers are of a smaller particle size than the inorganic pigments of the base coating layers.

11. A media sheet as in claim 10, wherein the inorganic pigments of the base coating layers have a mean size from 0.2 μm to 1.5 μm.

12. A media sheet as in claim 10, wherein the inorganic pigments of the receiving layers have a mean size from 0.1 μm to 0.5 μm.

13. A media sheet as in claim 1, wherein the inorganic pigments of the receiving layer or the base coating layer has an index of particle size distribution from 1.5 to 6.

14. A media sheet as in claim 6, wherein the receiving layers further includes from 0.1 to 8 parts by weight binder.

15. A media sheet as in claim 1, wherein at least one of the discharge control agent of the base coating layer and the discharge control agent of the receiving layer is a polyelectrolyte.

16. A media sheet as in claim 15, wherein the polyelectrolyte has a polar side group.

17. A media sheet as in claim 16, wherein the polyelectrolyte having the polar side group is a sulfonated polystyrene.

18. A media sheet as in claim 17, wherein the sulfonated polystyrene is a sodium salt of sulfonated polystyrene.

19. A media sheet as in claim 15, wherein the polyelectrolyte has a weight average molecular weight from 70,000 Mw to 1,000,000 Mw.

20. A media sheet as in claim 1, wherein both the discharge control agent of the base coating layer and the discharge control agent of the receiving layer is a sulfonated polystyrene.

21. A media sheet as in claim 1, wherein each of base coating layers are applied at a coating weight from 5 to 30 $g/m^2$.

22. A media sheet as in claim 1, wherein each of the receiving layers is applied at a coating weight from 5 to 30 $g/m^2$.

23. A media sheet as in claim 1, wherein each of the base coating layers and the receiving layers are from about 10 μm to 15 μm in thickness.

24. A media sheet as in claim 1, wherein the receiving layers are devoid of a dedicated binder, and wherein the discharge control agent is not a binder.

25. A media sheet for color electrophotographic printing, comprising:

a) base stock having a first side and a second opposing side;

b) base coating layers coated directly on the first side and the second side, the base coating layers including inorganic pigments, a binder, and a discharge control agent; and c) receiving layers, different than the base coating layers, coated directly on the base coating layers, the receiving layers including inorganic pigments, a binder, and a sodium salt of a sulfonated polystyrene discharge control agent.

26. A media sheet as in claim 25, wherein the binder of the receiving layers includes hollow particle pigments.

27. A media sheet as in claim 25, wherein the discharge control agent has a weight average molecular weight from 70,000 Mw to 1,000,000 Mw.

28. A media sheet as in claim 25, wherein the inorganic pigments of the receiving coating layers are of a smaller particle size than the inorganic pigments of the base coating layers.

29. A media sheet as in claim 28, wherein the inorganic pigments of the base coating layers have a mean size from 0.2 μm to 1.5 μm.

30. A media sheet as in claim 28, wherein the inorganic pigments of the receiving layers have a mean size from 0.1 μm to 0.5 μm.

31. A media sheet as in claim 25, wherein the inorganic pigments of the receiving layer or the base coating layer has an index of particle size distribution from 1.5 to 6.

* * * * *